Oct. 9, 1928.

C. R. DAELLENBACH 1,687,196

BATTERY HEATER

Filed April 1, 1927    2 Sheets-Sheet 1

Inventor
CARL R. DAELLENBACH

WITNESSES

By

Attorney

Oct. 9, 1928.

C. R. DAELLENBACH

BATTERY HEATER

Filed April 1, 1927   2 Sheets-Sheet 2

WITNESSES
Guy M Spring
Wm. R. Smith

Inventor
CARL R. DAELLENBACH
By Richard B. Owen, Attorney

Patented Oct. 9, 1928.

1,687,196

UNITED STATES PATENT OFFICE.

CARL R. DAELLENBACH, OF ELLWOOD CITY, PENNSYLVANIA, ASSIGNOR TO RAYMOND E. DAELLENBACH, OF ELLWOOD CITY, PENNSYLVANIA.

BATTERY HEATER.

Application filed April 1, 1927. Serial No. 180,302.

This invention relates to a heater and more particularly to a heater designed to heat the sealing compound of a storage battery, and has for its primary object the construction of a heater that will more effectively accomplish this result with a minimum amount of heat generated.

An object of the invention is the construction of a heater electrically operated and so designed and connected to the battery that the amount of current consumed will be reduced to a minimum and the heat generated concentrated upon the battery in a manner to produce the best effect.

An object of the invention is the construction of a heater that may be quickly and effectively secured to the battery and which is capable of accommodating different size batteries.

Besides the above, my invention is distinguished in the use of the heater involving three major structures, one for effective clamping engagement with the battery, the other for generating and concentrating heat, and the remaining for indicating the temperature of the heater so as to prevent the battery from being overheated.

With these and other objects in view, my invention will be better understood from a description of the same when taken in connection with the accompanying drawings, wherein:—

Figure 1:
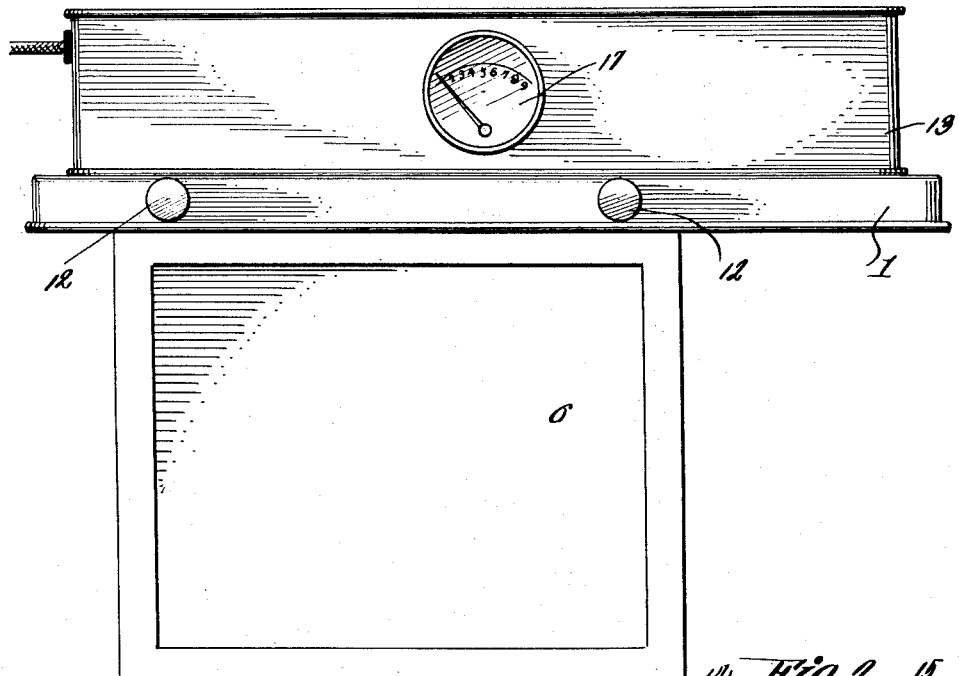
Figure 1 is a side elevation of my improved heater in applied position.

Again referring to the drawings illustrating one of the many constructions of my invention, the numeral 1 designates the base, shown in this particular instance as of rectangular configuration and provided with a centrally arranged rectangular opening 2 of an area to accommodate the smallest as well as the largest battery now manufactured. To facilitate the connection of the base with the battery and to accommodate batteries of different sizes and further to protect certain parts thereof, I provide a stationary plate 3 secured to the base and having an overhanging flange 4 so as to embrace and enclose one of the handles 5 of the battery 6. The other handle 7 of the battery is similarly enclosed and embraced by an overhanging flange 8 carried by the end section 9 of an extensible closure plate 10, the other end section 11 of which being secured to the base.

To effectively and substantially secure the base to the battery, I provide a plurality of clamping devices, illustrated in the drawings as thumb screws 12 threaded through the base to engage the sides of the battery, and due to the relative arrangement of the thumb screws and the overhanging flanges, it will be appreciated that the base is supported in its most advantageous position to properly expose the upper surface of the battery to the heat generated in the manner now to be described.

The casing or cover 13 is hingedly connected to the base, as indicated at 14, so as to have vertical swinging movement to cover or expose the top surface of the battery, in the former case to concentrate the heat generated upon the top of the battery and in the latter case to allow ready access to the battery for removing the heated sealing material.

Figure 2:
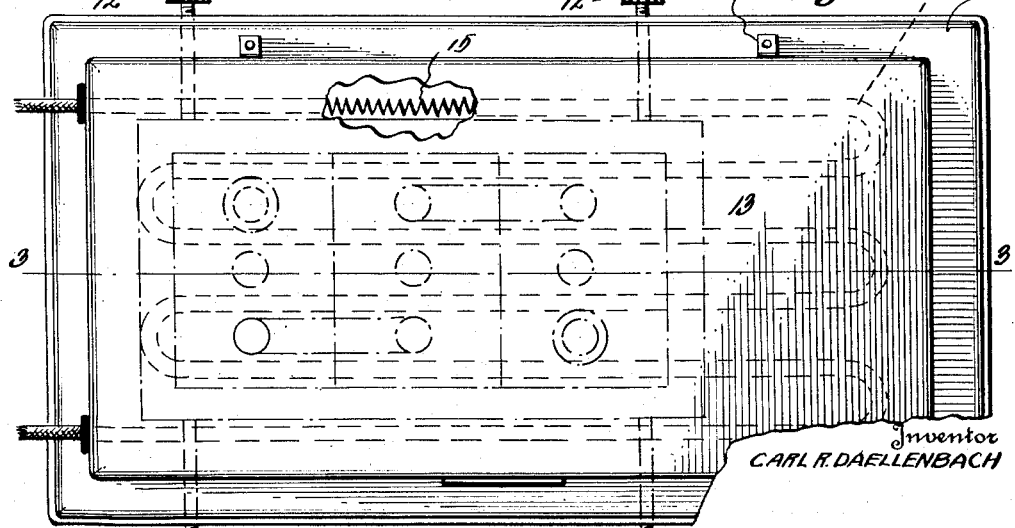
Figure 2 is a top plan view.
Figure 3:
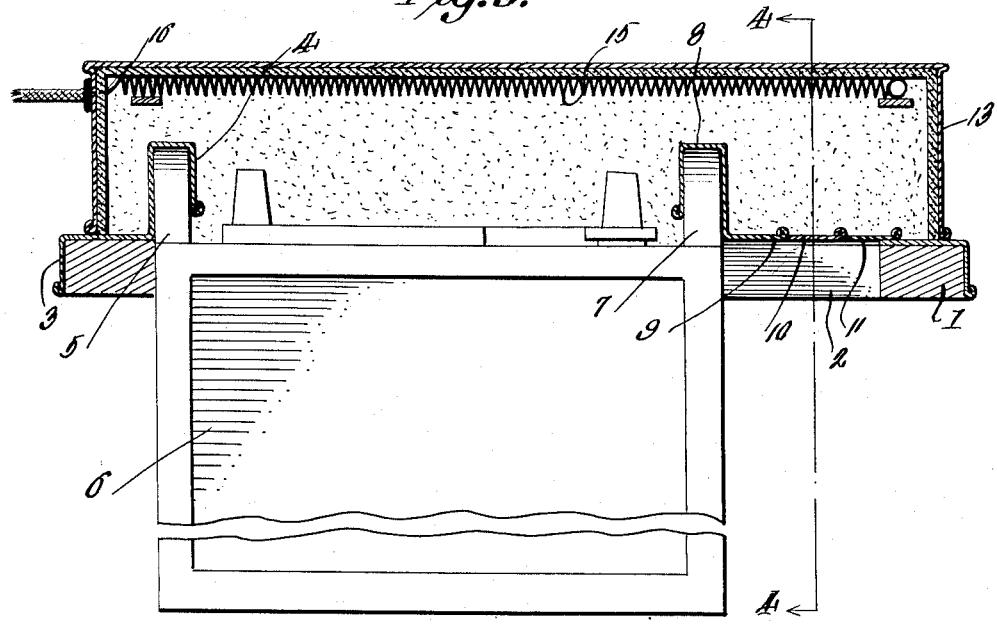
Figure 3 is a longitudinal sectional view.
Figure 4:
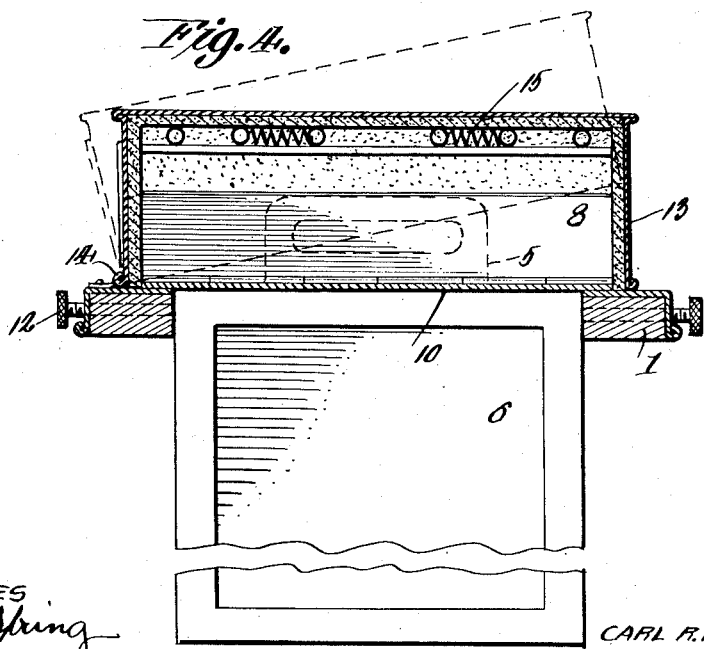
Figure 4 is a cross sectional view.

Various forms of heating devices may be utilized with my heater, but I find it preferable to utilize a plurality of electric heat coils 15 so disposed, as illustrated in Figure 2 of the drawings, as to have its greatest effect upon the sealing compound arranged between the various binding posts, filling caps and casing of the battery. As the cover is lined with insulating material 16, it will be appreciated that owing to the relative arrangement of the heating coils, heat will be concentrated and directed onto the upper surface of the battery to quickly and effectively soften the sealing compound for the ready removal thereof. As the heater is of a portable construction, that is to say very light and compact, it will be appreciated that a heating apparatus may be designed with a group of heaters so that a plurality of batteries may be acted upon simultaneously or individually and in such a manner that ready access may be had to the heated surface of each battery individually.

To complete the invention, I provide a heat indicator 17, by means of which visible indication is given as to the degree of temperature so that the battery will not be heated beyond a predetermined degree, which would be injurious thereto.

From the foregoing description taken in connection with the accompanying drawings, it will be appreciated that I have provided a heater economical in construction, that may be readily attached to and detached from a battery, and when in place will quickly and effectively subject the sealing compound to a heating operation and while in such heated condition the device can be adjusted to allow ready access to the compound for removal thereof. It will also be appreciated that the device is designed to accommodate various sized batteries and when in place the operator will be given accurate indication as to the temperature of the heat to which the battery is subject.

Of course, it will be understood that the heater may be designed and shaped in various other manners than illustrated and the various parts may be constructed in various other manners and associated in other relations and, therefore, I do not desire to be limited in any manner except as set forth in the appended claims.

I claim:—

1. A battery heater comprising a base having an opening therein to accommodate a portion of the battery, means for clamping the base to the battery, a cover movably connected to the base to extend over the battery, and an electric heating unit supported by the cover in close proximity to the battery.

2. A battery heater comprising a base having an opening therein to accommodate a portion of the battery, members secured to the base for engaging the handles of the battery, a cover hinged to the base for enclosing the top surface of the battery, and an electric heating unit supported by said cover.

3. A battery heater comprising a base having an opening therein to accommodate a portion of the battery, plates secured to the base for engaging the handles of the battery, a cover hinged to the base for enclosing the upper portion of the battery, an electric heating unit supported by said cover, said cover having a lining of heat insulating material, one of said plates being of an extensible construction, and means for securing the base to the battery.

4. A battery heater comprising a base having an opening to accommodate a portion of the battery, screws mounted in the base for clamping engagement with the battery, a stationary plate upon the base having an overhanging flange for engagement with one of the handles of the battery, an extensible plate upon the base for partially closing said opening and engaging the other handle of the battery, a cover hinged to the base to be positioned over the battery, a lining of heat insulating material for the cover, and a plurality of electric heating coils supported by the cover in a predetermined position relative to the upper surface of the battery.

5. A battery heater comprising a casing adapted to have embracing relation with a battery and provided with flanged extensions for extension over the handles of a battery, and heating means arranged within the casing.

6. A battery heater comprising a casing adapted to be disposed over the upper portion of a battery and provided with a pair of flanges for embracing relation with the handles of the battery, and an electric heating unit arranged within the casing in parallel relation to the top of the battery.

7. A battery heater comprising a base for embracing relation with a battery to be heated, interlocking connection between the base and one handle of the battery, an adjustable connection between the other handle of the battery and the base, and heating means supported by the base in parallel relation with the top of the battery.

8. In combination, an enclosed heating means for heating the upper portion of a battery, adjustable means for adapting said first means to different sizes of batteries, and clamp devices for clamping the said heating means to various sizes of batteries.

In testimony whereof I affix my signature.

CARL R. DAELLENBACH.